United States Patent
Kabasawa et al.

(10) Patent No.: US 9,906,052 B2
(45) Date of Patent: Feb. 27, 2018

(54) POWER SUPPLY DEVICE

(71) Applicant: FDK CORPORATION, Minato-ku, Tokyo (JP)

(72) Inventors: Takashi Kabasawa, Tokyo (JP); Takuya Harada, Tokyo (JP); Hiroshi Fukuda, Tokyo (JP); Zenjirou Uchida, Tokyo (JP); Masanori Yamashita, Tokyo (JP)

(73) Assignee: FDK CORPORATION, Tokyo (JP)

( * ) Notice: Subject to any disclaimer, the term of this patent is extended or adjusted under 35 U.S.C. 154(b) by 102 days.

(21) Appl. No.: 14/890,132

(22) PCT Filed: Apr. 11, 2014

(86) PCT No.: PCT/JP2014/060490
§ 371 (c)(1),
(2) Date: Nov. 9, 2015

(87) PCT Pub. No.: WO2014/181634
PCT Pub. Date: Nov. 13, 2014

(65) Prior Publication Data
US 2016/0105045 A1    Apr. 14, 2016

(30) Foreign Application Priority Data

May 10, 2013 (JP) .................................. 2013-100292

(51) Int. Cl.
H02J 7/00 (2006.01)
(52) U.S. Cl.
CPC .......... *H02J 7/0021* (2013.01); *H02J 7/0022* (2013.01); *H02J 7/0068* (2013.01); *H02J 7/0072* (2013.01); *H02J 7/0081* (2013.01); *H02J 7/0091* (2013.01)
(58) Field of Classification Search
USPC .......................... 320/101, 112, 116, 119, 132
See application file for complete search history.

(56) References Cited

U.S. PATENT DOCUMENTS

| | | | |
|---|---|---|---|
| 5,637,979 A | 6/1997 | Tamai et al. | |
| 5,998,969 A * | 12/1999 | Tsuji | H02J 7/0016 320/130 |
| 6,034,506 A | 3/2000 | Hall | |
| 2003/0015992 A1 | 1/2003 | Dubac et al. | |

(Continued)

FOREIGN PATENT DOCUMENTS

| | | |
|---|---|---|
| JP | 10-108360 | 4/1998 |
| JP | 2000-152495 A | 5/2000 |

(Continued)

OTHER PUBLICATIONS

Search Report for PCT/JP2014/060490, dated Jul. 1, 2014.
Extended European Search Report, for European Patent Application No. 14794570.3, dated Nov. 9, 2016, 9 pages.

*Primary Examiner* — Brian Ngo
(74) *Attorney, Agent, or Firm* — Kinney & Lange, P.A.

(57) ABSTRACT

A power supply device includes a battery module in which batteries are connected in series; a negative electrode output terminal to which a negative electrode terminal of the battery module is connected; a positive electrode output terminal to which a positive electrode terminal of the battery module and a connection point between predetermined batteries are individually connected through discharging switches; an output voltage detecting circuit for detecting an output voltage; a charging current adjusting circuit for adjusting the charging current of the battery module; thermistors for detecting the state-of-charge of the battery module; and a control device for controlling the charge and discharge of the battery module, wherein the control device includes means for controlling the discharging switches, so that the output voltage is within a specific range, and means for controlling the charging current adjusting circuit on the basis of the state-of-charge of each battery of the battery module.

1 Claim, 5 Drawing Sheets

(56) References Cited

U.S. PATENT DOCUMENTS

| | | | |
|---|---|---|---|
| 2003/0146737 A1* | 8/2003 | Kadouchi | H02J 7/0019 320/132 |
| 2004/0135544 A1* | 7/2004 | King | B60L 11/185 320/116 |
| 2006/0012336 A1* | 1/2006 | Fujita | H02J 7/0021 320/119 |
| 2007/0210746 A1* | 9/2007 | Tanjou | H02J 7/0021 320/112 |
| 2010/0164430 A1* | 7/2010 | Lu | H01M 10/441 320/103 |
| 2010/0237829 A1* | 9/2010 | Tatebayashi | H01M 4/661 320/118 |
| 2011/0025272 A1 | 2/2011 | Nagashima et al. | |
| 2013/0002202 A1* | 1/2013 | Kuraishi | H02J 7/0014 320/119 |
| 2013/0063080 A1* | 3/2013 | Shiraishi | H02J 7/0014 320/107 |
| 2013/0069594 A1* | 3/2013 | Jung | H01M 10/425 320/112 |
| 2014/0021923 A1* | 1/2014 | Uchida | H02J 7/0016 320/118 |
| 2015/0200552 A1* | 7/2015 | Nortman | H02J 7/0016 320/134 |

FOREIGN PATENT DOCUMENTS

| | | |
|---|---|---|
| JP | 2000-217266 A | 8/2000 |
| JP | 2005151683 A | 6/2005 |
| JP | 2007-267564 A | 10/2007 |
| JP | 2009-213242 A | 9/2009 |
| JP | 2011-055649 A | 3/2011 |
| JP | 2013-021835 A | 1/2013 |

\* cited by examiner

POWER SUPPLY DEVICE

TECHNICAL FIELD

The present invention relates to a power supply device provided with a battery module in which batteries are connected in series.

BACKGROUND ART

There has been heretofore known a power supply device in which electrical charges are stored in a plurality of capacitors to use these charges as electrical power for electronic equipment and the like. In such a power supply device, the fluctuation of output voltage due to a variation in a state-of-charge of the capacitors becomes a problem. In order to obtain a constant output voltage even if the state-of-charge of the capacitors varies, it is conceivable to use, for example, a switching power supply, such as a heretofore-known DC-DC converter or the like. Incorporating a switching power supply causes electrical power loss, however, and may cause a significant increase in the size and cost of the power supply device.

Hence, as a related art intended to prevent output voltage fluctuations due to a variation in the state-of-charge of capacitors without incorporating any switching power supplies, there has been heretofore known a power supply device in which a bypass circuit is provided in each of capacitors to switch the connection of the capacitors according to the state-of-charge of each capacitor (see, for example, Patent Document 1). There has also been heretofore known a power supply device in which for the same purpose as described above, a plurality of intermediate tap output terminals for extracting electrical power from each connection point of capacitors through a switch is disposed to control each switch according to the voltage fluctuation of the capacitors, thereby switching among the intermediate tap output terminals (see, for example, Patent Document 2).

In a power supply device configured in such a way as described above, there arises the problem of the state-of-charge of capacitors becoming imbalanced for reasons of the configuration. As a related art intended to solve such a problem, there has been heretofore known a power supply device in which, for example, a plurality of taps for extracting electrical power from each connection point of capacitors through a switch is disposed to select a capacitor to be connected to a battery charger through these taps according to the voltage of the battery charger at the time of charging (see, for example, Patent Document 3). There has also been heretofore known a power supply device in which for the same purpose as described above, a plurality of output capacitors and a plurality of adjusting capacitors are disposed, the adjusting capacitors are series-connected to or disconnected from the output capacitors to adjust an output voltage, and relaxation charging is performed on adjusting capacitors not connected to any output capacitors, in order to prevent voltage reduction due to self-discharge (see, for example, Patent Document 4).

PRIOR ART DOCUMENT

Patent Document

Patent Document 1: Japanese Patent Laid-Open No. 10-108360

Patent Document 2: Japanese Patent Laid-Open No. 2009-213242

Patent Document 3: Japanese Patent Laid-Open No. 2011-55649

Patent Document 4: Japanese Patent Laid-Open No. 2000-152495

SUMMARY OF THE INVENTION

Problems to be Solved by the Invention

In the case of, for example, a back-up power supply device required to supply electrical power to equipment, such as a sever, installed in a data center for a prolonged period of time in case of power failure, the above-described power supply devices using capacitors may not be able to supply sufficient electrical power to the equipment. In addition, a large number of capacitors are required in order for a power supply device using capacitors to be able to supply sufficient electrical power. Thus, the power supply device may increase in size. Accordingly, secondary batteries, such as nickel-hydrogen secondary batteries, are often used in the power supply device for such a purpose of use as described above.

If all of the capacitors are replaced with secondary batteries in the power supply device of the above-described related art, however, the battery-to-battery state-of-charge of the secondary batteries become imbalanced. Accordingly, if the secondary batteries are simultaneously charged at the time of charge, some of the batteries may be overcharged. Consequently, unlike in the case of capacitors, the degradation of charge-discharge characteristics or the like may occur in the secondary batteries due to overcharge. In addition, an attempt to individually charge the secondary batteries according to the state-of-charge of each secondary battery may involve complicating a circuit configuration, thus causing a significant cost increase and greatly prolonging a charging time.

An object of the present invention, which has been accomplished in view of such circumstances as described above, is to provide a power supply device capable of supplying an increased amount of electrical power at low cost.

Means for Solving the Problems

First Embodiment of the Present Invention

A first embodiment of the present invention is a power supply device provided with a battery module in which batteries are connected in series; a negative electrode output terminal to which a negative electrode terminal of the battery module is connected; a positive electrode output terminal to which a positive electrode terminal of the battery module and a connection point between predetermined batteries are individually connected through switches; an output voltage detecting circuit for detecting an output voltage between the positive electrode output terminal and the negative electrode output terminal; a charging current adjusting circuit for adjusting a charging current of the battery module; a state-of-charge detecting circuit for detecting a state-of-charge of each battery of the battery module; and a control device for controlling charge and discharge of the battery module, wherein the control device includes means for controlling the switches, so that the output voltage is within a specific range, and means for controlling the charging current adjusting circuit on the basis of the state-of-charge of each battery of the battery module.

At the time of discharge, the switches are controlled so that the output voltage is within a specific range. More specifically, one of the switches is selected and closed so that the output voltage is within a specific range. Consequently, the output voltage can be held within a specific range, irrespective of the state-of-charge of the battery module, using a low-cost configuration not including any switching power supplies. This configuration causes the state-of-charge of each battery of the battery module to become imbalanced, however. Accordingly, if constant-current charging with a constant current value is performed at the time of charging the battery module, some of the batteries may be overcharged, thus resulting in, for example, a degradation in the charge-discharge characteristics of the battery module. In this case, such a problem as the degradation of the charge-discharge characteristics due to overcharge is reduced if, for example, constant-current charging is performed with a uniformly low current value irrespective of the state-of-charge of each battery of the battery module. Such charge control requires a considerable amount of time for all batteries of the battery module to be fully charged, however, and is therefore not realistic.

Hence, in the present invention, the charging current adjusting circuit is controlled on the basis of the state-of-charge of each battery of the battery module. That is, at the time of charge, the value of the charging current of the battery module is adjusted on the basis of the state-of-charge of each battery of the battery module. Consequently, it is possible to significantly shorten the time taken to fully charge the battery module, while reducing the possibility of the degradation of charge-discharge characteristics and the like arising in some of the batteries of the battery module due to overcharge.

Consequently, according to the first embodiment of the present invention, it is possible to obtain the working effect of being able to provide a power supply device capable of supplying an increased amount of electrical power at low cost.

Second Embodiment of the Present Invention

A second embodiment of the present invention is a power supply device, wherein in the above-described first embodiment of the present invention, the control device includes means for constant-current charging the battery module with a first current value on condition that none of the batteries of the battery module is fully charged; and means for constant-current charging the battery module with a second current value smaller than the first current value on condition that any of the batteries of the battery module is fully charged.

As described above, the battery module is constant-current charged with the first current value at the time of charge, until any of the batteries of the battery module is fully charged. Consequently, the battery module can be charged rapidly. After any of the batteries of the battery module is fully charged, the battery module is constant-current charged with the second current value smaller than the first current value. Consequently, it is possible to reduce the possibility of the degradation of charge-discharge characteristics or the like arising in the already fully charged battery due to overcharge, while continuing to charge batteries not yet fully charged.

Advantageous Effects of the Invention

According to the present invention, it is possible to provide a power supply device capable of supplying an increased amount of electrical power at low cost.

DESCRIPTION OF THE EMBODIMENTS

Hereinafter, embodiments of the present invention will be described while referring to the accompanying drawings.

It should be noted that needless to say, the present invention is not limited to the embodiments to be described hereinafter but may be modified in various other ways within the scope of the present invention as defined by the claims appended hereto.

<Configuration of Power Supply Device>

The configuration of a power supply device according to the present invention will be described while referring to FIG. 1.

Figure 1:
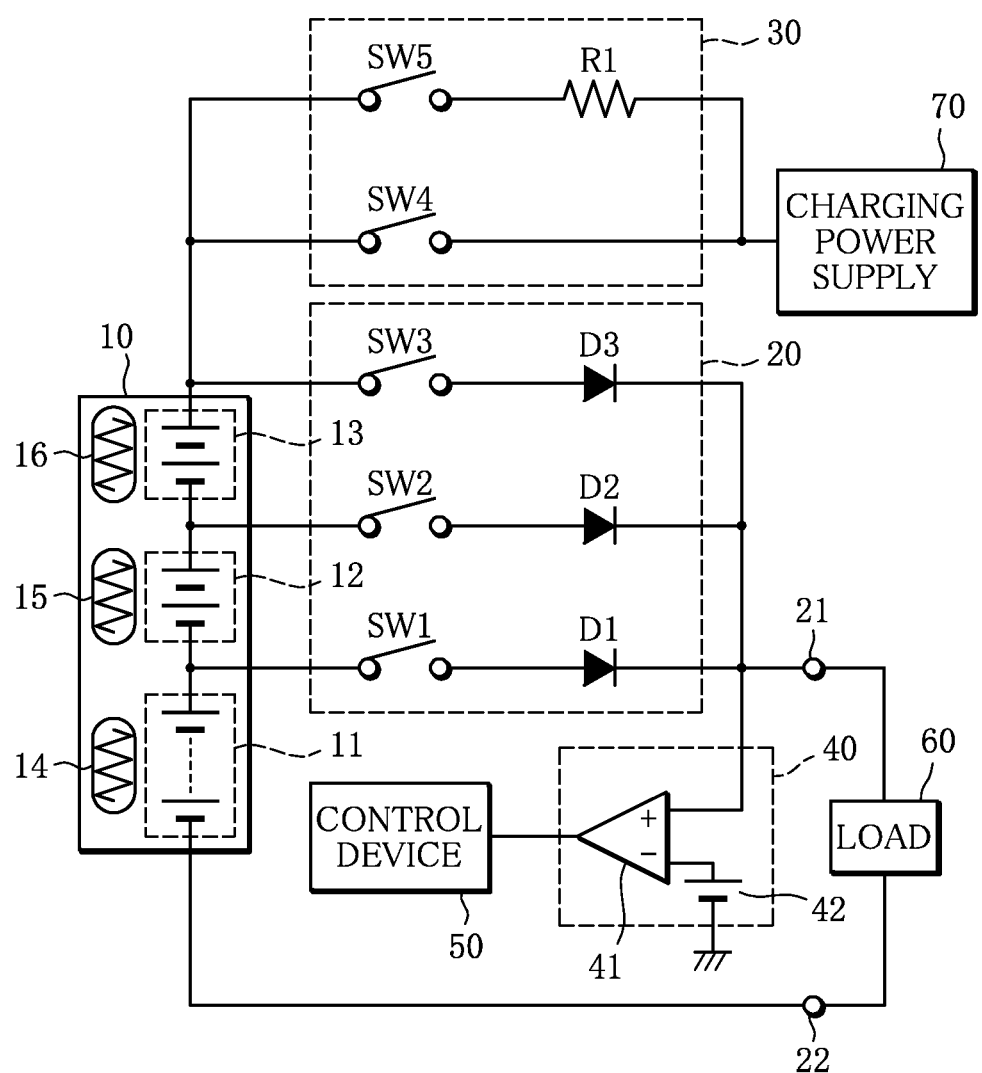
FIG. 1 is a circuit diagram illustrating the configuration of a power supply device according to the present invention.

FIG. 1 is a circuit diagram illustrating the configuration of the power supply device according to the present invention.

The power supply device according to the present invention is provided with a battery module 10; a discharging voltage adjusting circuit 20; a charging current adjusting circuit 30; an output voltage detecting circuit 40; and a control device 50.

The battery module 10 is configured by connecting batteries in series and includes a first battery bank 11, a second battery bank 12 and a third battery bank 13 each of which is configured in units of a predetermined number of batteries. Batteries constituting the first battery bank 11, the second battery bank 12 and the third battery bank 13 are secondary batteries, such as rechargeable alkaline storage batteries. More specifically, the batteries are, for example, nickel-hydrogen secondary batteries.

The battery module 10 includes a first thermistor 14, a second thermistor 15 and a third thermistor 16 serving as a "state-of-charge detecting circuit." The first thermistor 14 detects the temperature of the first battery bank 11. The second thermistor 15 detects the temperature of the second battery bank 12. The third thermistor 16 detects the temperature of the third battery bank 13. The output signals of the first thermistor 14, the second thermistor 15 and the third thermistor 16 are output to the control device 50. The control device 50 calculates and determines the state-of-charge of each of the first battery bank 11, the second battery bank 12 and the third battery bank 13 from the output signals of the first thermistor 14, the second thermistor 15 and the third thermistor 16.

The discharging voltage adjusting circuit 20 includes three discharging switches SW1 to SW3, three rectifying diodes D1 to D3, a positive electrode output terminal 21, and a negative electrode output terminal 22. One end of the discharging switch SW1 is connected to a connection point between the first battery bank 11 and the second battery bank 12, and the other end of the discharging switch SW1 is connected to the anode terminal of the rectifying diode D1. One end of the discharging switch SW2 is connected to a connection point between the second battery bank 12 and the third battery bank 13, and the other end of the discharging switch SW2 is connected to the anode terminal of the rectifying diode D2. One end of the discharging switch SW3 is connected to the positive electrode terminal of the battery module 10 (the positive electrode of the third battery bank 13), and the other end of the discharging switch SW3 is connected to the anode terminal of the rectifying diode D3. The positive electrode output terminal 21 is connected to the cathode terminals of the rectifying diodes D1 to D3. That is, the positive electrode terminal of the battery module 10, the connection point between the first battery bank 11 and the second battery bank 12, and the connection point between the second battery bank 12 and the third battery bank 13 are individually connected to the positive electrode output terminal 21 through the discharging switches SW1 to SW3. The negative electrode output terminal 22 is connected to the negative electrode terminal of the battery module 10 (negative electrode of the first battery bank 11). A load 60, such as sever equipment, is connected to the positive electrode output terminal 21 and the negative electrode output terminal 22. The discharging switches SW1 to SW3 are open/close-controlled by the control device 50.

The charging current adjusting circuit 30 is a circuit for adjusting the charging current of the battery module 10 and includes two charging switches SW4 and SW5 and a current-limiting resistor R1. One end of the charging switch SW4 is connected to the positive electrode terminal of the battery module 10, and the other end of the charging switch SW4 is connected to a charging power supply 70. One end of the charging switch SW5 is connected to the positive electrode terminal of the battery module 10, and the other end of the charging switch SW5 is connected to one end of the current-limiting resistor R1. The other end of the current-limiting resistor R1 is connected to the charging power supply 70. The charging switches SW4 and SW5 are open/close-controlled by the control device 50.

The output voltage detecting circuit 40 is a circuit for detecting an output voltage (voltage between the positive electrode output terminal 21 and the negative electrode output terminal 22) and includes a comparator 41 and a reference-voltage power supply 42. The comparator 41 is an operational amplifier, the non-inverting input terminal of which is connected to the positive electrode output terminal 21 and the inverting input terminal of which is connected to the reference-voltage power supply 42. Accordingly, the voltage of the output terminal of the comparator 41 equals a voltage corresponding to the difference between the output voltage and a reference voltage. The output terminal of the comparator 41 is connected to the control device 50.

The control device 50 is a heretofore-known microcomputer-controlled device and controls the charge and discharge of the battery module 10. More specifically, the control device 50 performs control to select and close one of the discharging switches SW1 to SW3 at the time of discharge, so that the output voltage is within a specific range. In addition, the control device 50 controls the charging current adjusting circuit 30 at the time of charge, on the basis of the state-of-charge of each of the first battery bank 11, the second battery bank 12 and the third battery bank 13.

<Discharge Control>

Discharge control by the control device 50 will be described while referring to FIGS. 2 and 3.

Figure 2:
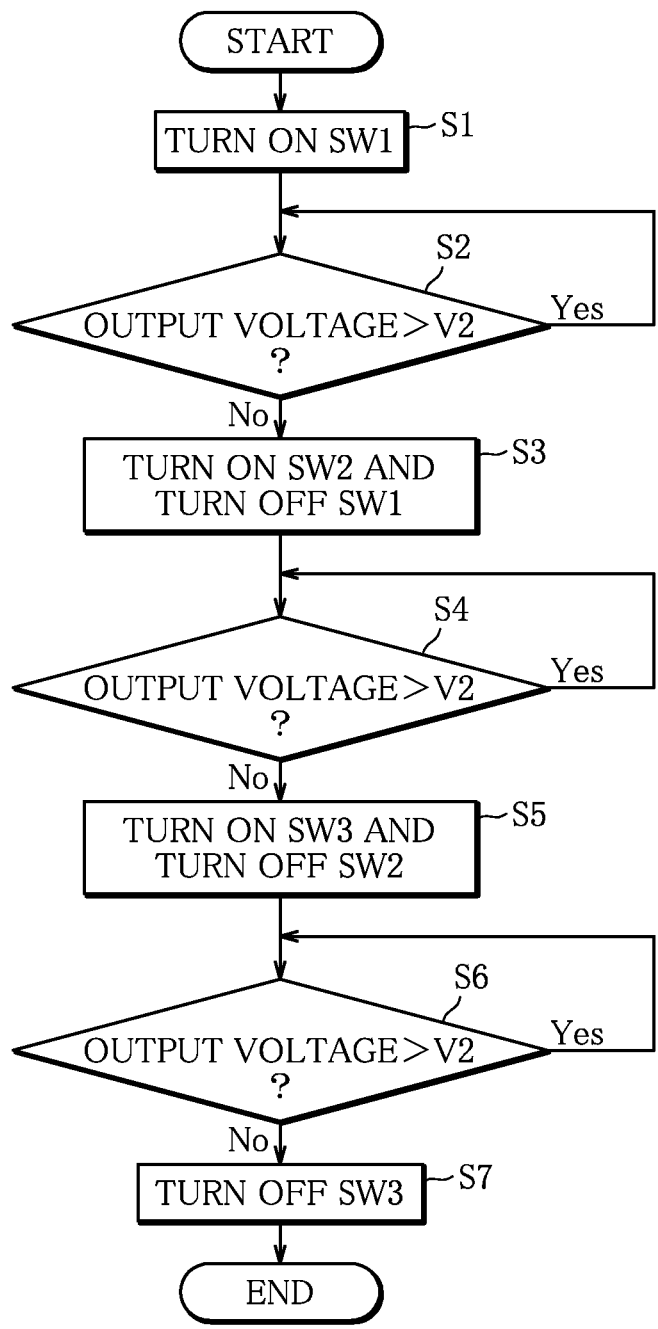
FIG. 2 is a flowchart illustrating a procedure of discharge control by a control device.

FIG. 2 is a flowchart illustrating a procedure of discharge control by the control device 50. FIG. 3 is a timing chart illustrating the variation of an output voltage based on discharge control by the control device 50.

Figure 3:
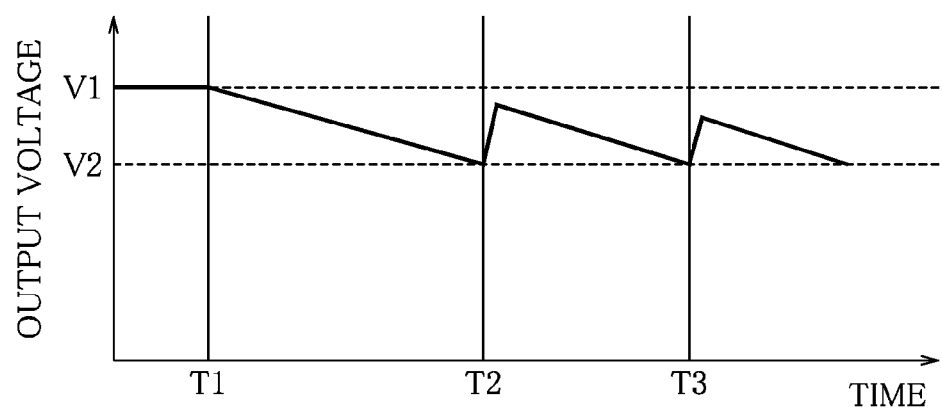
FIG. 3 is a timing chart illustrating the variation of an output voltage based on discharge control by the control device.

First, the discharging switch SW1 is turned on (step S1 in FIG. 2 and a time T1 in FIG. 3). Consequently, the full-charge voltage V1 of the first battery bank 11 is set as the output voltage. Subsequently, a determination is made whether or not the output voltage is higher than a voltage threshold V2 (step S2 in FIG. 2). The voltage threshold V2 is a value for defining the lower limit of the output voltage and is set as appropriate, according to specifications of the power supply device and the like.

The discharging switch SW1 is maintained turned on during a period of the output voltage being higher than the voltage threshold V2 (Yes in step S2). If the state-of-charge of the first battery bank 11 lowers in level and at the moment when the output voltage falls at the voltage threshold V2 or lower (No in step S2), the discharging switch SW2 is turned on and the discharging switch SW1 is turned off (step S3 in FIG. 2 and a time T2 in FIG. 3). Consequently, a voltage given by adding the voltage of the second battery bank 12 to the voltage of the first battery bank 11 is set as the output voltage. Thus, the output voltage rises to a voltage higher than the voltage threshold V2.

Subsequently, a determination is made whether or not the output voltage is higher than the voltage threshold V2 (step S4 in FIG. 2). The discharging switch SW2 is maintained turned on during a period of the output voltage being higher than the voltage threshold V2 (Yes in step S4). If the state-of-charge of the second battery bank 12 lowers in level and at the moment when the output voltage falls at the voltage threshold V2 or lower (No in step S4), the discharging switch SW3 is turned on and the discharging switch SW2 is turned off (step S5 in FIG. 2 and a time T3 in FIG. 3). Consequently, a voltage given by adding the voltage of the second battery bank 12 and the voltage of the third battery bank 13 to the voltage of the first battery bank 11 is set as the output voltage. Thus, the output voltage rises to a voltage higher than the voltage threshold V2.

Subsequently, a determination is made whether or not the output voltage is higher than the voltage threshold V2 (step S6 in FIG. 2). The discharging switch SW3 is maintained turned on during a period of the output voltage being higher than the voltage threshold V2 (Yes in step S6). If the state-of-charge of the third battery bank 13 lowers in level and at the moment when the output voltage falls at the voltage threshold V2 or lower (No in step S6), the discharging switch SW3 is turned off to stop discharge from the battery module 10 (step S7 in FIG. 2).

In this way, the output voltage can be maintained within a range of voltages equal to or lower than the full-charge voltage V1 of the first battery bank 11 but higher than the voltage threshold V2. Consequently, the output voltage can be held within a specific range, irrespective of the state-of-charge of the battery module 10, using a low-cost configuration not including any switching power supplies.

<Charge Control>

Charge control by the control device 50 will be described while referring to FIGS. 4 and 5.

Figure 4:
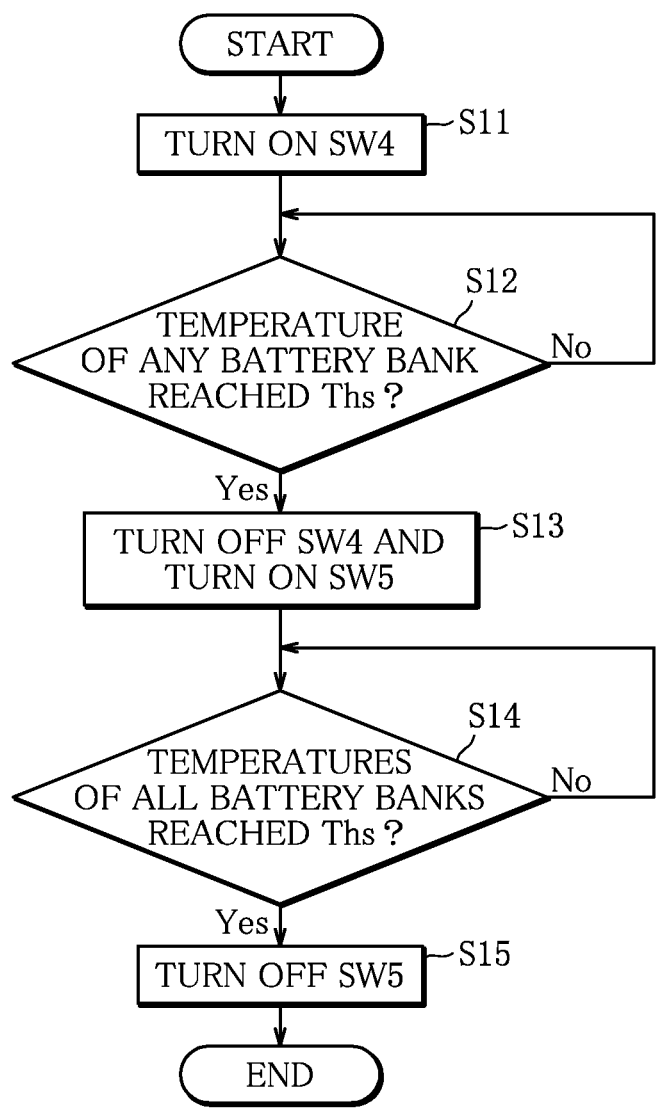
FIG. 4 is a flowchart illustrating a procedure of charge control by the control device.

FIG. 4 is a flowchart illustrating a procedure of charge control by the control device 50. FIG. 5 is a timing chart illustrating the variation of an output voltage based on charge control by the control device 50.

Figure 5:
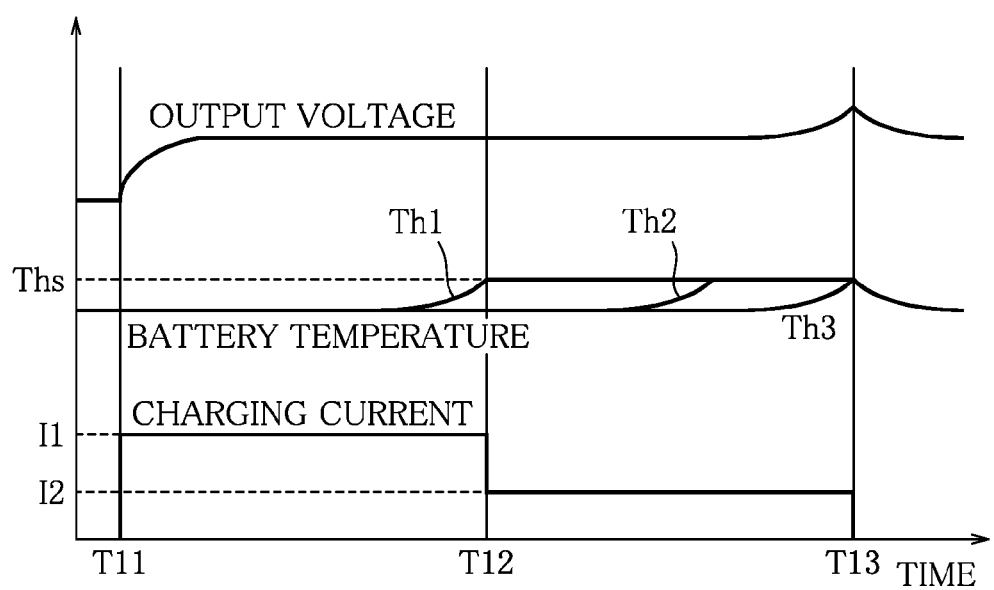
FIG. 5 is a timing chart illustrating the variation of an output voltage based on charge control by the control device.

First, the charging switch SW4 is turned on (step S11 in FIG. 4 and a time T11 in FIG. 5). Consequently, constant-current charging of the battery module 10 with a first current value I1 is started. From the viewpoint of performing even more rapid constant-current charging, the first current value I1 is preferably set to as high a current value as possible, according to specifications of batteries constituting the battery module 10 and the like.

Subsequently, a determination is made whether or not any of the temperature Th1 of the first battery bank 11, the temperature Th2 of the second battery bank 12 and the temperature Th3 of the third battery bank 13 has reached a temperature threshold Ths (step S12 in FIG. 4). The temperature threshold Ths is set to a value which is detectable a temperature rise when any of the state-of-charge of the first battery bank 11, the second battery bank 12 and the third battery bank 13 reaches a full-charge state by constant-current charging.

The current value of constant-current charging is maintained at the first current value I1 during a period in which none of the temperature Th1 of the first battery bank 11, the temperature Th2 of the second battery bank 12 and the temperature Th3 of the third battery bank 13 has reached the temperature threshold Ths (No in step S12). That is, the control device 50 constant-current charges the battery module 10 with the first current value I1 on the condition that none of the first battery bank 11, the second battery bank 12 and the third battery bank 13 has been fully charged. Consequently, the battery module 10 can be charged rapidly.

Then, at the moment when any of the temperature Th1 of the first battery bank 11, the temperature Th2 of the second battery bank 12 and the temperature Th3 of the third battery bank 13 reaches the temperature threshold Ths (Yes in step S12), for example, when the temperature Th1 of the first battery bank 11 reaches the temperature threshold Ths, the charging switch SW4 is turned off and the charging switch SW5 is turned on. Consequently, the battery module 10 is constant-current charged through the current-limiting resistor R1. The current value of constant-current charging therefore decreases from the first current value I1 to the second current value I2 (step S13 in FIG. 4 and a time T12 in FIG. 5).

The second current value I2 is set to a current value lower than the first current value I1 and can be set to an optional current value by the resistance value of the current-limiting resistor R1. More specifically, the second current value I2 is preferably set, according to specifications of batteries constituting the battery module 10 and the like, to a sufficiently low current value at which the degradation of battery characteristics or the like due to overcharge is unlikely to occur. That is, the control device 50 constant-current charges the battery module 10 with the second current value I2 smaller than the first current value I1, on the condition that any of the first battery bank 11, the second battery bank 12 and the third battery bank 13 has been fully charged. Consequently, it is possible to reduce the possibility of the degradation of charge-discharge characteristics or the like arising in the already fully charged battery bank due to overcharge, while continuing to charge battery banks not yet fully charged.

Subsequently, a determination is made whether or not all of the temperature Th1 of the first battery bank 11, the temperature Th2 of the second battery bank 12 and the temperature Th3 of the third battery bank 13 have reached the temperature threshold Ths (step S14 in FIG. 4). The control device 50 continues constant-current charging with the second current value I2 during a period in which not all of the temperature Th1 of the first battery bank 11, the temperature Th2 of the second battery bank 12 and the temperature Th3 of the third battery bank 13 have reached the temperature threshold Ths (No in step S14). Then, at the moment when all of the temperature Th1 of the first battery bank 11, the temperature Th2 of the second battery bank 12 and the temperature Th3 of the third battery bank 13 have reached the temperature threshold Ths, i.e., when all of the first battery bank 11, the second battery bank 12 and the third battery bank 13 have been fully charged, the charging switch SW5 is turned off to finish constant-current charging the battery module 10 (step S15 in FIG. 4 and a time T13 in FIG. 5).

As described above, the power supply device according to the present invention adjusts the value of the charging current of the battery module 10 at the time of charge, on the basis of the state-of-charge of each of the first battery bank 11, the second battery bank 12 and third battery bank 13. Consequently, it is possible to significantly shorten the time taken to fully charge the battery module 10, while reducing the possibility of the degradation of charge-discharge characteristics or the like arising in some of the battery banks of the battery module 10 due to overcharge.

EXPLANATION OF REFERENCE SIGNS

10 Battery module
11 First battery bank
12 Second battery bank
13 Third battery bank
14 First thermistor
15 Second thermistor
16 Third thermistor
20 Discharging voltage adjusting circuit
21 Positive electrode output terminal
22 Negative electrode output terminal
30 Charging current adjusting circuit
40 Output voltage detecting circuit
50 Control device
D1 to D3 Rectifying diode
R1 Current-limiting resistor
SW1 to SW3 Discharging switch
SW4, SW5 Charging switch

The invention claimed is:
1. A power supply device comprising:
a battery module in which batteries are connected in series;
a negative electrode output terminal to which a negative electrode terminal of the battery module is connected;
a positive electrode output terminal to which a positive electrode terminal of the battery module and a connection point between predetermined batteries are individually connected through switches;
an output voltage detecting circuit for detecting an output voltage between the positive electrode output terminal and the negative electrode output terminal;
a charging current adjusting circuit for adjusting a charging current of the battery module;
a state-of-charge detecting circuit for detecting a state-of-charge of each battery of the battery module;
a control device for controlling charge and discharge of the battery module, wherein the control device includes:
means for controlling the switches, so that the output voltage is within a specific range, and
means for controlling the charging current adjusting circuit on the basis of the state-of-charge of each battery of the battery module
wherein the control device includes: means for constant-current charging the battery module with a first current value on condition that none of the batteries of the battery module is fully charged; and means for constant-current charging the battery module with a second current value smaller than the first current value on condition that any of the batteries of the battery module is fully charged.

\* \* \* \* \*